United States Patent [19]
Goshay et al.

[11] Patent Number: 5,802,454
[45] Date of Patent: Sep. 1, 1998

[54] REMOTELY DISTRIBUTED LOCATION AND MESSAGING SYSTEM

[75] Inventors: William K. Goshay, Yorba Linda, Calif.; Joseph W. Sheehan, Wayne, Pa.; Barry D. Atkinson, Los Angeles, Calif.; Edward A. Hurst, Oakton, Va.; Richard A. Jackson, Kanata, Canada; Mario Proietti, Fullerton, Calif.

[73] Assignee: Teletrac, Inc., Kansas City, Mo.

[21] Appl. No.: 573,066

[22] Filed: Dec. 15, 1995

[51] Int. Cl.⁶ ..................................................... H04Q 7/08
[52] U.S. Cl. ............................................................. 455/31.2
[58] Field of Search ................... 455/31.2; 340/825.44, 340/370.02, 370.03

[56] References Cited

U.S. PATENT DOCUMENTS

| | | | |
|---|---|---|---|
| 4,178,476 | 12/1979 | Frost . | |
| 4,644,351 | 2/1987 | Zabarsky et al. . | |
| 4,651,156 | 3/1987 | Martinez . | |
| 4,651,157 | 3/1987 | Gray et al. . | |
| 4,700,374 | 10/1987 | Bini . | |
| 4,740,792 | 4/1988 | Sagey et al. . | |
| 5,040,238 | 8/1991 | Comroe et al. | 455/33 |
| 5,159,701 | 10/1992 | Barnes et al. | 455/15 |
| 5,175,727 | 12/1992 | Maher et al. | 370/58.1 |
| 5,194,860 | 3/1993 | Jones et al. | 340/370.02 |
| 5,218,716 | 6/1993 | Comroe et al. | 455/33.4 |
| 5,343,512 | 8/1994 | Wang et al. | 379/59 |

*Primary Examiner*—William Cumming
*Attorney, Agent, or Firm*—Roylance,Abrams,Berdo & Goodman,L.L.P.

[57] ABSTRACT

A network of interconnected, remotely distributed, location and messaging systems. Each of the remotely distributed location and messaging systems can be dynamically configured to use different frequencies that are assigned to the regions. Each of the remotely distributed location and messaging systems performs location requests for specified subscriber unit using one or more radio frequency transmitting sites and a plurality of radio frequency receiving sites. The location request is initiated by identifying a particular one of the location and messaging systems having a coverage area for the specified subscriber unit. The location request is routed to the identified location and messaging systems, and a unique paging message is transmitted to the subscriber unit. A response is received from the subscriber unit, and forwarded to a processor coupled to the identified location and messaging system. The processor resolves the response from the subscriber unit into a location for the subscriber unit within the coverage area of the identified location and messaging system.

20 Claims, 8 Drawing Sheets

STAGE 1

FIG. 3A

STAGE 2

FIG. 3B

FIG. 3C
STAGE 3

REMOTELY DISTRIBUTED LOCATION AND MESSAGING SYSTEM

BACKGROUND OF THE INVENTION

1. Field of the Invention

The present invention relates generally to providing location and messaging services, and more specifically, to a network structure coupling a plurality of remotely distributed location and messaging systems to a centrally located network operations center.

2. Description of the Related Art

Location tracking or monitoring systems are well known in the art. Such systems use time of arrival (TOA) calculations for transmissions received from subscriber units (SUs) to determine the location of the subscriber units within the service area. The position of the subscriber units can be determined and graphically displayed on computer monitors in a matter of seconds. As a result, for example, fleet vehicle operators can continuously track the position of their vehicles on digitized road maps. In addition, individual car owners have an effective system for recovering their vehicle in the event of a theft. Examples of such systems include the Teletrac™ location and messaging system.

However, such location and messaging systems are centralized and thus capital-intensive to construct and maintain. Thus, there is a need in the art for a remotely distributed location and messaging system that provides these services cost effectively.

SUMMARY OF THE INVENTION

To overcome the limitations in the prior art described above, and to overcome other limitations that will become apparent upon reading and understanding this specification, the present invention discloses a network of interconnected, remotely distributed, location and messaging systems. The topology of the network may be structured in a variety of ways to meet geographical requirements at minimum cost.

Each of the remotely distributed location and messaging systems can be dynamically configured to use a plurality of different frequencies that are assigned to the regions. This dynamic configuration occurs by specifying parameters required for handling responses in a particular frequency.

Each of the remotely distributed location and messaging systems performs location requests for specified subscriber units (SUs) using one or more radio frequency transmitting sites and a plurality of radio frequency receiving sites. The location request is initiated by identifying a particular one of the remotely distributed location and messaging systems having a coverage area for the specified subscriber unit. The location request is routed to the identified remotely distributed location and messaging systems, and a unique paging message is transmitted to the subscriber unit. A response is received from the subscriber unit, and forwarded to a processor coupled to the identified remotely distributed location and messaging system. The processor resolves the response from the subscriber unit into a location for the subscriber unit within the coverage area of the identified remotely distributed location and messaging system.

The system can correlate the location to an "episode," e.g., a stolen car episode, a roadside assistance episode, or an external request for a vehicle location. The correlated episode and response to the location request may be dynamically routed to a value-added reseller coupled to the remotely distributed location and messaging systems using a routing table.

One object of the present invention is to provide more efficient utilization of equipment in the network structure. Another object of the invention is to provide an improved configuration that provides a relatively simple and economical construction.

An advantage of the present invention is that it provides a significant reduction in capital costs. Another advantage of the present invention is that much less equipment is used in the distributed systems making them easier to locate and construct. Yet another advantage is that additional installations can be considered because of the lower cost of locating and constructing these distributed systems as compared to traditional systems. Moreover, the remote sites have fewer regulatory or lease problems than traditional sites.

BRIEF DESCRIPTION OF THE DRAWINGS

Referring now to the drawings in which like reference numerals represent corresponding parts thereof:

FIG. 3 is comprised of FIGS. 3A, 3B, 3C and 3D, which represent various configurations of the new architecture according to the present invention;

FIG. 4 is comprised of FIGS. 4A, 4B, 4C, and 4D, which are block diagrams that illustrate various functions performed by the new architecture according to the present invention;

FIG. 5 is comprised of FIGS. 5A and 5B, which are block diagrams that illustrate various functions performed by the new architecture according to the present invention.

DETAILED DESCRIPTION OF THE PREFERRED EMBODIMENT

In the following description of the preferred embodiment, reference is made to the accompanying drawings which form a part hereof, and in which is shown by way of illustration, a specific embodiment in which the invention may be practiced. It is to be understood that other embodiments may be used and changes may be made without departing from the scope of the present invention.

Overview

The present specification describes the system architecture and software functionality for a Distributed Location and Messaging System (DLMS) providing the same services that are currently being commercially offered by Teletrac™. In essence, the present invention provides a new and different architecture for more efficiently providing the same services as the Teletrac™ system and allowing for additional services that were difficult, if not impossible, to provide under prior art architectures.

Prior Art

Figure 1:
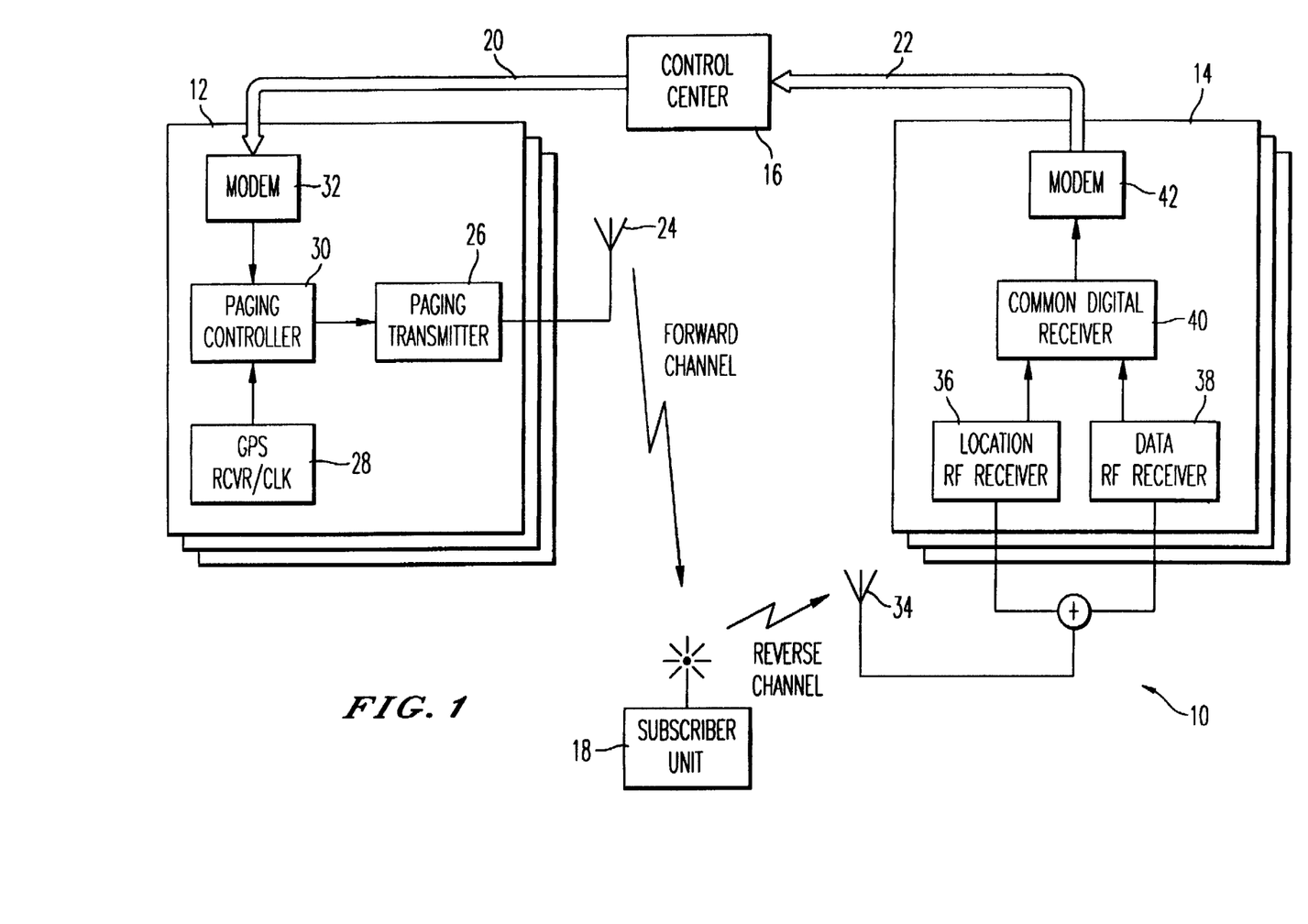
FIG. 1 is a block diagram that illustrates the prior art Teletrac™ system architecture.

FIG. 1 is a block diagram that illustrates the architecture of the prior art Teletrac™ system 10. The prior art Teletrac™ system comprises a radio frequency (RF) infrastructure with Transmit Sites 12 and Receive Sites 14, a Control Center 16 and mobile (or stationary) transceivers or subscriber units (SUs) 18. The Transmit Sites 12 and Receive Sites 14 are connected to the Control Center 16 via dedicated lines 20 and 22. Customers and value-added resellers (VAR) or service providers (SP) also access the system via dedicated lines or the Public Switched Telephone System (PSTN).

The majority of the computer hardware and system software, needed to compute locations, send and receive messages and communicate with customers, is located in the Control Center 16. The remainder of the computer hardware and system software is located at the Transmit Sites 12 and Receive Sites 14.

The subscriber units 18 may be installed in vehicles, carried by persons, or used in stationary applications (e.g., fixed site monitoring applications), and contain both a receiver and transmitter that allow for a two-way data exchange with the rest of the system. A calibration subscriber unit is normally collocated at one or more of the Receive Sites 14.

In the Teletrac™ location and messaging system 10 of FIG. 1, the Control Center 16 initiates a location request by simulcast paging of the subscriber unit 18 via the Transmit Sites 12. The paging message comprises the unique identifier of the particular subscriber unit 18. The subscriber unit 18 responds to the simulcast paging with a specific response at a particular time period after the page. Each of the Receive Sites 14 that pick-up the subscriber unit 18 transmission, identify the time of arrival (TOA) of the received transmission, and forward this information to the Control Center 16. The Control Center 16 resolves the TOA information from all of these Receive Sites 14 into a location within the coverage area for the subscriber unit 18.

A typical Transmit Site 12 for the Teletrac™ location and messaging system 10 is comprised of a number of components, including an antenna 24, paging transmitter 26, global positioning satellite (GPS) receiver and clock 28, and a paging controller 30. In paging a subscriber unit 18, the processors in the Control Center 16 transmit data to the appropriate Transmit Sites 12 via a modem 32 on the dedicated lines 20. The data comprises a batch of addresses identifying the subscriber units 18 to be paged and/or message information, wherein the data is preferably formatted according to a standard POCSAG protocol developed for paging systems. The batch is then fed into the paging controller 30 where it is checked for accuracy and is buffered to await the signal that allows it to be transmitted. The GPS receiver 28 generates the timing pulses for transmitting the data, so that a batch of data is simultaneously transmitted from all Transmit Sites 12 as simulcast page signals for the subscriber units 18. Each transmitted batch contains a portion which is used to synchronize the subscriber units 18 to respond in their appropriate time slot, and the Receive Sites 14 to expect the subscriber unit 18 transmission in a particular time interval.

A typical subscriber unit 18 is generally comprised of a transceiver with an application-specific device attached thereto, as well as an antenna. The subscriber unit 18 receives a paging signal from the Transmit Sites 12, and then transmits a response signal that is picked up by Receive Sites 14 in the coverage area. The time of arrival (TOA) of these response signals to each Receive Site 14 allows the location of the responding subscriber unit 18 to be computed.

A typical Receive Site 14 for the Teletrac™ location and messaging system 10 is comprised of a number of components, including an antenna 34, location RF receiver 36, data RF receiver 38, and common digital receiver 40. In the preferred embodiment, the antenna 34 is designed to capture RF signals from subscriber units 18 as well as the Transmit Sites 12. Periodically, the clocks of the Receive Sites 14 are synchronized via a calibration process wherein a location signal is transmitted from a very accurately known location a set number of times, and time of arrival data are collected and processed to yield clock adjustment values for each of the Receive Sites 14. When paging a particular subscriber unit 18, the Transmit Sites 12 will send a POCSAG batch which is led by a synchronization code word. When the Receive Sites 14 pickup and recognize the synchronization code word, they then expect the subscriber unit 18 response in one of a plurality of possible time slots following the synchronization code word. These time slots contain a signal from a subscriber unit 18 that is responding to a page from the Transmit Sites 12. If the response is detected in the right time slot, then the Receive Site 14 determines that the subscriber unit 18 has responded to the page.

The receivers 36 and 38 may perform a number of functions, such as amplification, demodulation, and downconverting, before outputting the signals to the common digital receiver 40. The common digital receiver 40, which provides the digital processing functions for the Receive Site 14, receives the signals and determines the range count assigned to the responding subscriber unit 18 for the Receive Site 14. The range count is determined by comparing or correlating the response signal from the subscriber unit 14 to a stored code in the common digital receiver 40. The common digital receiver 40 also compares the in-phase and out-of-phase signals from the receivers 36 and 38 for frequency deviation, so that the data can be further tagged with a quality rating. The common digital receiver 40 then transmits the range count and quality rating to the Control Center 16 via the modem 42 for further processing.

The architecture shown in FIG. 1 was designed to service a single metropolitan coverage area on single set of preassigned frequencies for the forward (paging) channel and reverse (response) channel. Hence, the entire architecture must be replicated to provide Teletrac™ services to a geographically separated area. It is also difficult to add software functionality to the Teletrac™ system 10 due to the insufficient modularity of the software design. These factors make it costly to install the Teletrac™ system 10 in other markets, make it difficult to add services, and prohibit taking advantage of efficiencies and cost savings afforded by advances in processor capability and distributed computing techniques.

In order to eliminate these drawbacks, it is necessary to implement a totally new system architecture with the inherent flexibility that allows easy expansion to meet the increasing processing needs of new services as well as a growing customer base, and to dramatically reduce the cost of rolling out the system to additional markets.

Distributed Location and Messaging System

Figure 2:
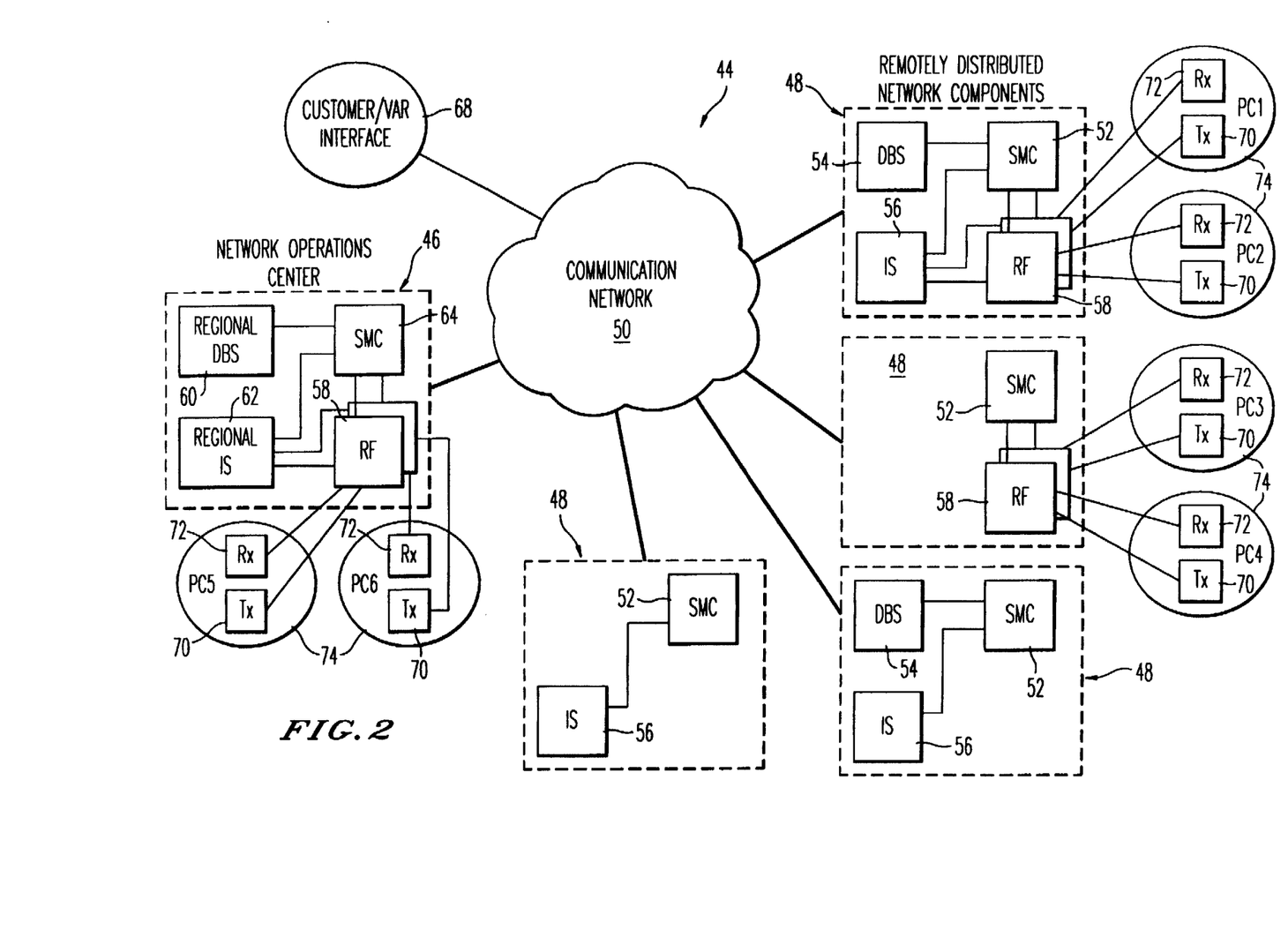
FIG. 2 is a block diagram that illustrates representative components of the new system architecture, referred to as the Distributed Location and Messaging System (DLMS), which provides the location and messaging services.

FIG. 2 is a block diagram that illustrates representative components of the new system architecture, referred to as the Distributed Location and Messaging System (DLMS) 44, which provides location and messaging services. Those skilled in the art will recognize that the DLMS 44 is not limited to the type and number of components shown in FIG. 2. The fundamental components of the DLMS 44 are: one or more Network Operations Centers (NOC) 46, zero, one or more Remotely Distributed Network Components (RDNC) 48 of various types, and a Communication Network (CN) 50 that provides point-to-point connectivity among the DLMS 44 components.

The Communication Network 50 is implemented via a collection of commercially available wireline and wireless communication services. Generally, it is implemented by dial-up links, packet switched networks or via the Internet.

Each Remotely Distributed Network Component 48 is comprised of the appropriate mix of the following subsystems: System Monitoring and Control (SMC) subsystem 52, Database Services (DBS) subsystem 54, Information Services (IS) subsystem 56, and Radio Frequency (RF) subsystem 58. The type and number of subsystems required in an Remotely Distributed Network Component 48 is determined by the functions to be performed.

A nominal Network Operations Center 46 is comprised of a Regional DBS subsystem 60, a Regional IS subsystem 62, a Regional SMC subsystem 64, and zero, one or more RF subsystems 58, although, in its simplest form, a Network Operations Center 46 may be comprised of an RF subsystem 58 only. In general, the Network Operations Center 46 and Remotely Distributed Network Components 48 are geographically separated and connected via existing Communication Network 50.

Users and VARs 68 can connect to the DLMS 44 via the Communication Network 50 or via the RF infrastructure with use of their subscriber unit. The communication paths between the RF subsystems 58 and their associated Transmit Sites 70 and Receive Sites 72 are shown as separate from the Communication Network 50 for simplicity only. In general, these paths will also be part of the Communications Network 50.

Subsystem Functionality

The SMC subsystem 64 and 52 comprises the processors, devices, and associated software that are responsible for monitoring and controlling (locally or remotely) the operation of all DLMS 44 components of the system. The SMC subsystem 64 and 52 collects status information from all subsystems at the Network Operations Center 46 and in the Remotely Distributed Network Components 48, respectively, and relays it back to a monitoring point (nominally a SMC subsystem 64 performed by a processor in the Network Operation Center 46). The SMC subsystem 64 provides the operator interface and delivers commands to the subsystems being monitored. These commands may be automatically or manually initiated. In the example in FIG. 2, the SMC subsystem 64 at the Network Operations Center 46 provides a centralized monitoring and control function for all remotely distributed components, as well as for the other subsystems present in the Network Operation Center 46.

The RF subsystems 58 comprises the processors, devices, and associated software that are responsible for controlling and processing the information flow over the RF portion of the system. This includes: queuing subscriber unit page requests, scheduling and transmitting the page data, receiving synchronous and asynchronous subscriber unit transmission data, computing locations, calibrating the system, providing status information to the SMC subsystems 52 and 64, and interfacing to the IS subsystems 56 and 62 to receive requests and return results. Zero, one or more RF subsystems 58 and 66 may be present in the Network Operations Center 46 or in any of the Remotely Distributed Network Components 48. Each RF subsystem 58 and 66 can control and process information from one Paging Configuration (PC) 74.

Each Paging Configuration 74 represents a complete, independent, synchronized and calibrated location and messaging system coverage area (metropolitan area in the current system) comprised of the equipment necessary for transmitting and receiving location and messaging signals. The Transmit Sites 70 and Receive Sites 72 are identical to those used in prior art Teletrac™ systems. However, the makeup of a Paging Configuration 74 (i.e., the number and location of the Transmit Sites 70 and Receive Sites 72, calibration zone definitions, number of forward and reverse channels, and definition of localcast regions) is contained in a Paging Configuration table stored in a memory of a processor in the RF subsystem 58 and 66, which is easily modified to accommodate changes and expansions to the actual equipment in the Paging Configuration 74. Further, each of the Paging Configurations can be dynamically configured to use a plurality of different frequencies that are assigned to the regions. This dynamic configuration occurs by specifying parameters required for handling responses in a particular frequency in the Paging Configuration table.

The IS subsystem 56 comprises the processors, devices, and associated software that are responsible for message processing and routing, and for interfacing to the internal and external users. This includes the functions of establishing and maintaining the communication interface to external customers, passing location and outbound messaging requests to the RF subsystems 58, receiving and processing inbound messages and locations from the RF subsystem 58, providing an operator interface to handle customer service requests (e.g., stolen vehicle, roadside assistance, subscriber unit installation checkout), storing and forwarding information, general routing of message and location data based on user needs, interfacing to the Regional IS subsystem 62, and providing status information to the SMC subsystem 64 and 52. The Regional IS subsystem 62, located in the Network Operations Center 46, provides essentially the same capabilities but is also able to route requests and responses to the distributed IS subsystems 56 and respond to routing requests from the distributed IS subsystems 56. There can be zero or one IS subsystem 56 in each DLMS 44 component. Also, the IS subsystem 56 or 62 can interface to more than one RF subsystem 58.

The DBS subsystems 54 comprises the processors, devices, and associated software that are responsible for storing and maintaining customer profile information for access authentication and routing instructions, and usage data for billing. This includes the functions of interfacing to the Regional DBS subsystem 60 and receiving and processing customer profile updates, interfacing to the IS subsystem 56 to provide response for customer data look up requests, summarizing and storing customer usage data obtained from the IS subsystem 56 and providing these data to the Regional IS subsystem 62 for billing purposes, and providing status information to the SMC subsystem 52. The Regional IS subsystem 62 performs the same functions and contains the master database for all customers in the coverage areas encompassed by the Remotely Distributed Network Component 48. It also interfaces with other external systems (not shown) responsible for customer data entry and financial functions. There can be zero or one DBS subsystem 54 or 60 in each DLMS 44 component.

Architectural Advantages

There are three characteristics of the architecture that are for the first time applied to a multilateration location and messaging system. These are: scaleable components, modularity of design, and point-to-point connectionless communication.

Increased demand for Teletrac™ location and messaging services will require rolling out to other geographic areas, as well as increasing the capacity of existing paging configurations. The old architecture required replicating 100% of the architecture in the new area for location services, while the message services involved significant software modifications. The new architecture provides a means to add only those Remotely Distributed Network Components 48, subsystems or subsystem modifications, necessary to meet these needs without costly software modifications. This characteristic is called scalability and is implemented by embedding in each component a configurable description of the component and by providing the software that appropriately reacts to modifications of these descriptions.

Closely associated with scalability is the characteristic of modularity, which is the ability to add, subtract or modify components with minimal impact on associated components. This is implemented by decomposing the system into functionally logical elements that appear as "black boxes" to each other and that interface through an agreed upon message protocol.

Robust communication among Teletrac™ components requires the use of both connection and connectionless information transfers. The ability for a Teletrac™ component to communicate with any other component through the Communication Network 50 without having to establish and hold a communication circuit between the two components nor be concerned with the actual makeup of the Communications Network, affords significant flexibility to the communication aspects of adding components and services. This characteristic is called point-to-point connectionless communications and is implemented by using an industry standard protocol (e.g., TCP/IP) that is packet switched (verses circuit switched) and includes the source/destination pair in the data packet.

These results of these three characteristics are further illustrated in the system configurations of FIGS. 3A, 3B, 3C, and 3D.

Figure 3A:
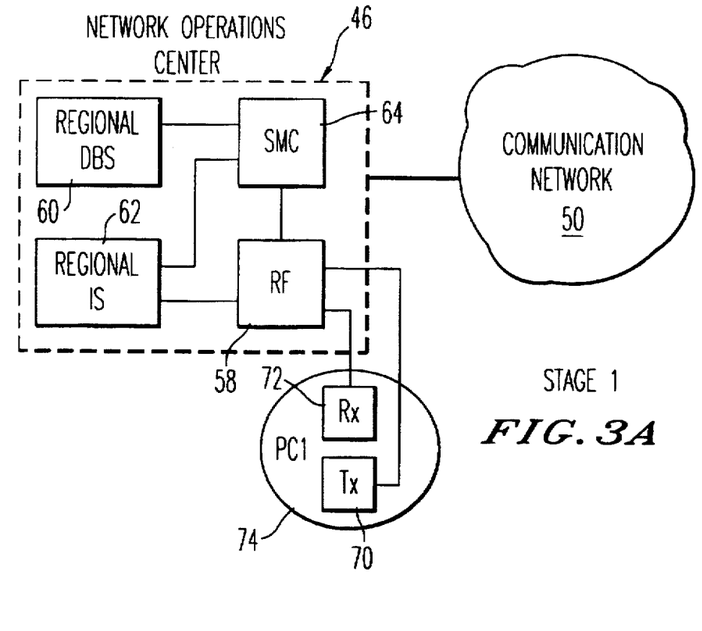

FIG. 3A represents an initial operational capability for the new architecture comprising a Communication Network 50 and a Network Operations Center 46 with a single RF subsystem 58 managing its Paging Configuration 74. The customers and/or VARs access the system via the Communications Network 50. The communication to the Transmit Sites 70 and Receive Sites 72 is also through the Communication Network 50, although it is shown connecting directly to the RF subsystem 58 for simplicity of illustration. This, for example, could be the Los Angeles Network Operations Center 46 with one operational metropolitan area.

Figure 3B:
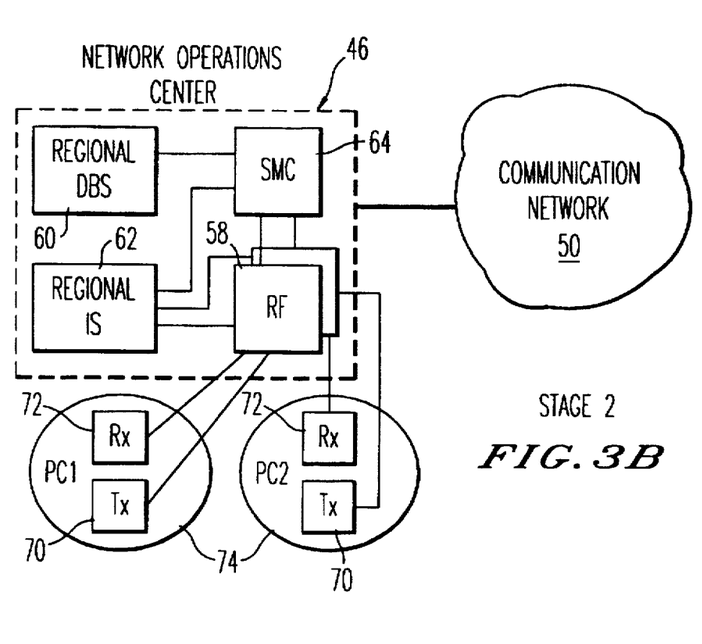

In FIG. 3B, the Network Operations Center 46 has been modified (scaled) to simultaneously handle two independent Paging Configurations (PC) 74. This is accomplished by adding another RF subsystem 58 and additional communication interface hardware if needed. Of course, all infrastructure hardware for the Transmit Sites 70 and Receive Sites 72 are assumed to be in place and operational. The makeup of the new Paging Configuration 74 is determined by the information contained in its Paging Configuration table. The addition of a second RF subsystem 58 does not necessitate the augmentation of the computer hardware. The operating system simply "sees" the new RF subsystem 58 as a set of additional processes to run when needed. On the other hand, computer hardware augmentations require little or no modifications to the subsystem software. This is in part due to the characteristics of the operating system used. Based on the user request and the last known location of an subscriber unit, the IS subsystem will now route the request through the appropriate RF subsystem 58. FIG. 3B, for example, could represent adding the San Diego metropolitan area to the system.

Figure 3C:
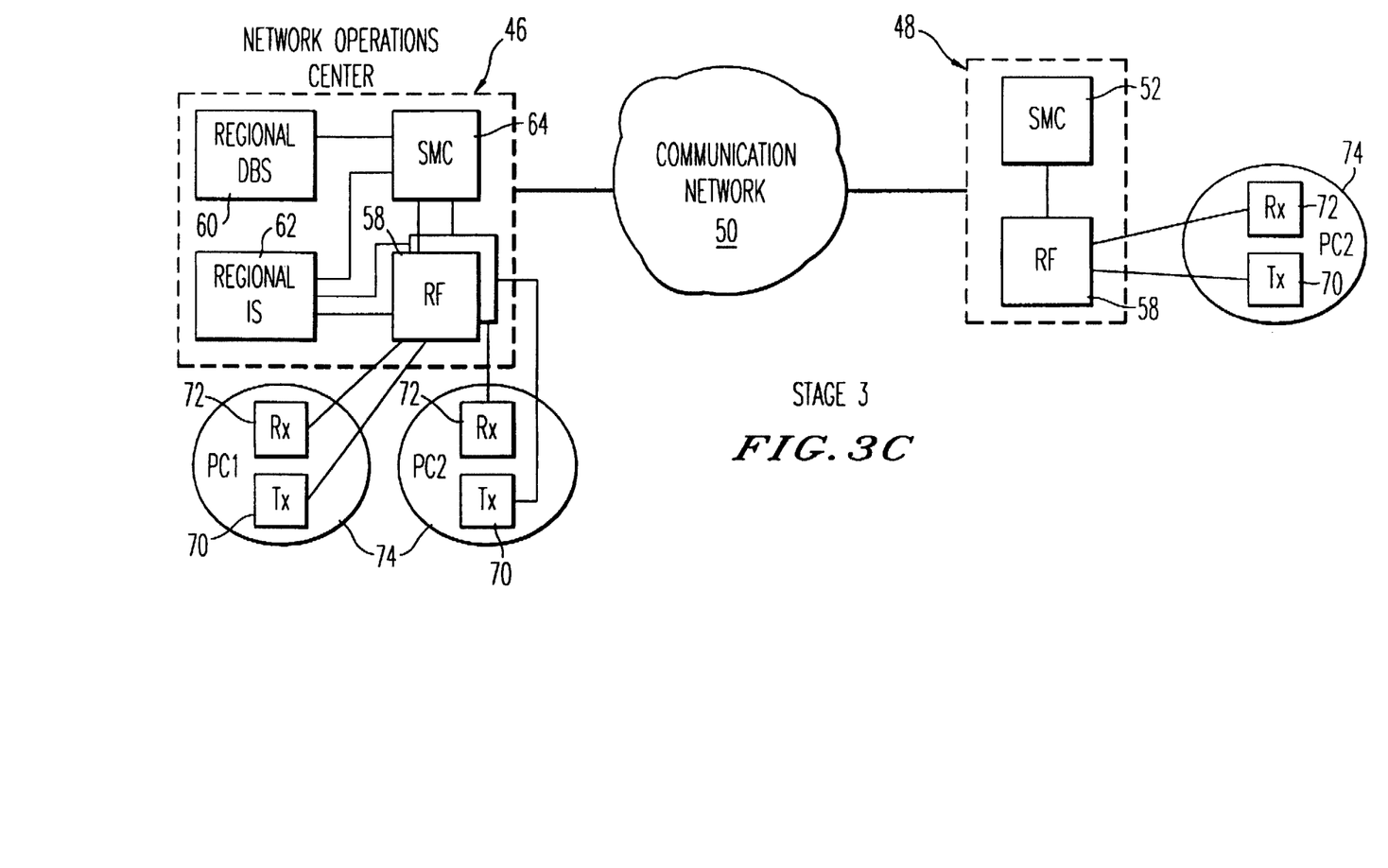

In FIG. 3C, the first Remotely Distributed Network Component 48 is added to the system, and contains both an SMC subsystem 52 and an RF subsystem 58 managing its Paging Configuration 74. This is accomplished by installing the computer hardware and appropriate system software in a remote (to the Network Operations Center 46) location and connecting them to the Communications Network 50. It is important to note that the RF subsystem 58 at Network Operations Center 46 and the Remotely Distributed Network Component 48 are virtually identical components, the differences being their Paging Configuration 74 tables and their addresses on the global Communications Network 50. The decision to utilize a Remotely Distributed Network Component 48, instead of adding another RF subsystem 58 in the Network Operations Center 46, considers the cost of communications and the rollout strategy. Notice that user requests (non-subscriber unit initiated) are fed through the Regional IS subsystem 62 in the Network Operation Center 46. This stage could, for example, represent adding the San Francisco Bay area to the system.

Figure 3D:
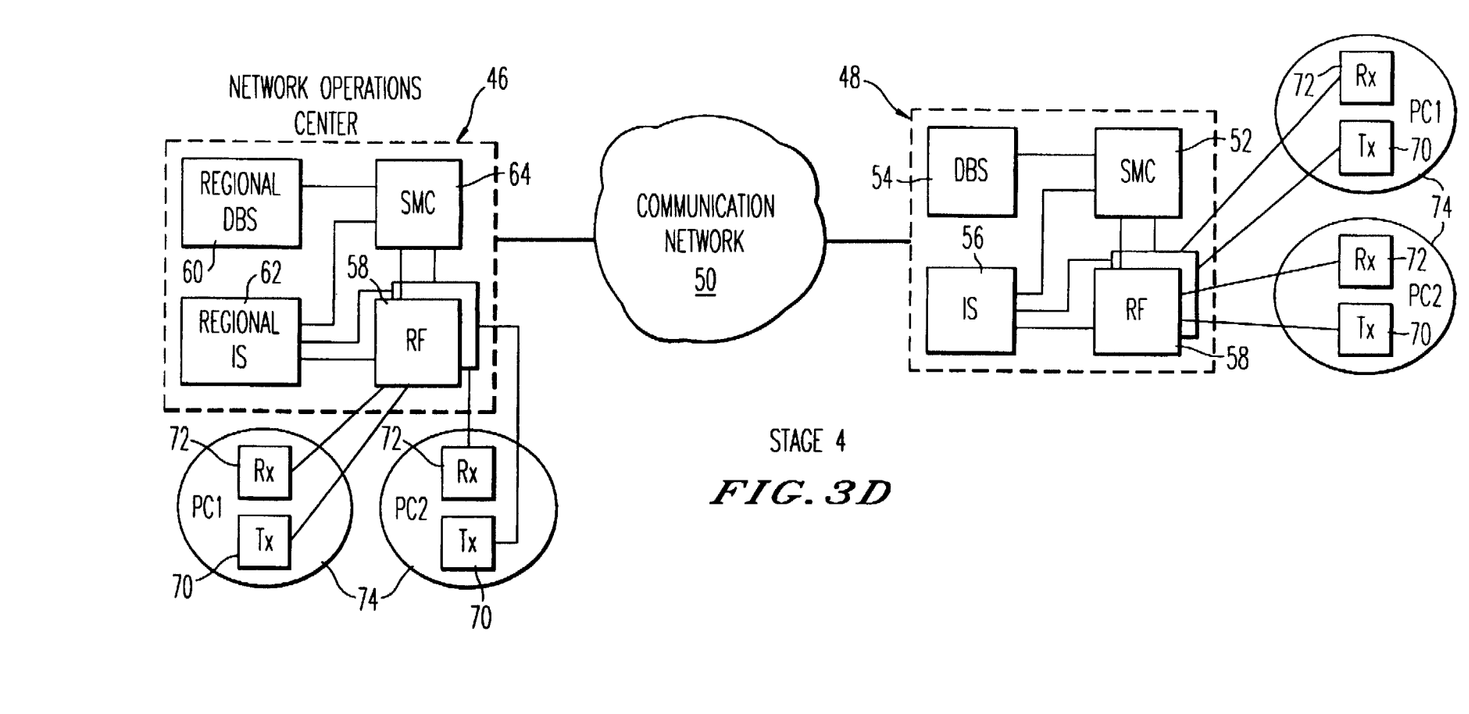

In FIG. 3D, a DBS subsystem 54, IS subsystem 56 and second RF subsystem 58 are added to the Remotely Distributed Network Component 48 from FIG. 3C. Adding these subsystems is accomplished by installing the appropriate system software and upgrading the computer and communication interface hardware, if needed. Since the subsystems are modular, simple changes to network addresses and configuration tables produce the desired interface changes. So, for example, in FIG. 3C, the RF subsystem 58, in the Remotely Distributed Network Component, would be (transparently) connected to the Regional IS subsystem 62 at the Network Operations Center 46, whereas in FIG. 3D it is (transparently) connected to the local IS subsystem 56. This stage could, for example, represent the addition of the Silicon Valley metropolitan area and, in recognition of the potential increase in the customer base, the corresponding addition of an IS subsystem 56 to handle the increased service load.

Software Functionality and Services

In the existing network architecture, metropolitan coverage areas are logically and geographically disjoint and self-contained. Transactions start and end in that coverage area. Thus, users must connect to each coverage area individually to obtain service from that coverage area, i.e., services such as regional or national coverage areas are difficult, if not impossible, to provide.

Another limitation is the unique (to Teletrac™) communication protocol used to connect to the system. This makes it difficult for users of commercially available networks to connect to the Teletrac™ system to obtain services.

In addition to the architectural advantages discussed above, the DLMS 44 also provides new software functionalities that eliminate the limitations above, enhance the existing Teletrac™ services and enable new ones. These are aimed at making Teletrac™ services more valuable to customers, value-added resellers and service providers.

Generic Routing

Generic routing allows information to be sent from one addressable point in the network to any other addressable point. Additionally, it provides for transactions to be sent to multiple destinations or to different destinations depending on factors such as time of day, state of the recipient (e.g., available or busy) and type of transaction (e.g., status message or emergency assistance). The system can correlate the location to an "episode," e.g., a stolen car episode, a roadside assistance episode, or an external request for a vehicle location. The correlated episode and response to the location request may be dynamically routed to a value-added reseller or service provider coupled to the system using a routing table. For example, the system would use generic routing to send roadside assistance transactions (sometimes called episodes), on a vehicle-by-vehicle basis, to the associated service provider. Also, a service providers could require that roadside transactions be routed to them only during normal business hours and at all other times to a secondary provider.

These generic routing functions are implemented by the IS subsystem 56 or 62 supported by data in the DBS subsystem 54 or 60. The latter maintains customer and subscriber unit profiles used by the IS subsystem 56 or 62 to determine the routing of user initiated transactions. There are several implementation possibilities depending on where the subscriber or subscriber unit data resides. In one implementation, the local IS subsystem 56 may have to request back to the Regional IS subsystem 62 at the Network Operations Center 46, implying that only the subscriber or subscriber unit data for the local Paging Configuration 74 is in the local DBS subsystem 54. In another implementation, it may be more efficient to replicate more or all of the subscriber/subscriber unit data in every DBS subsystem 54.

Regional Paging (Location and Messaging)

Regional paging allows a location request or an (outbound) message request to be serviced on a subscriber unit not in the Paging Configuration in which the request was originated. This effectively implements a seamless regional coverage service for Teletrac™ subscribers.

Figure 4A:
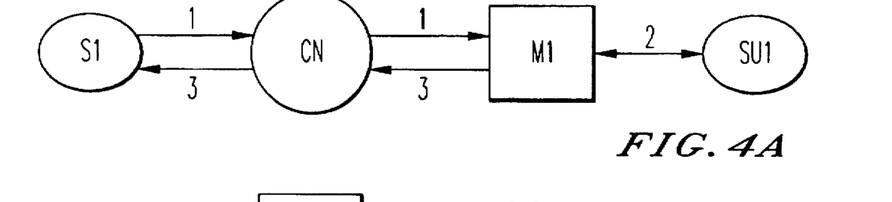

For example, FIG. 4A is a block diagram that illustrates the situation where the subscriber S1 requests the location of subscriber unit SU1 (1). The request is routed by the communications network CN to the Remotely Distributed Network Component M1 operating in the home metropolitan coverage area for SU1 (1). The M1 pages SU1 for its location (2), and receives the location response from SU1 (2). This location response is returned by the M1 to S1 via the CN (3). This is the nominal case of a subscriber requesting Teletrac™ location services when both the subscriber and the subscriber unit are in their home metropolitan coverage area.

Figure 4B:
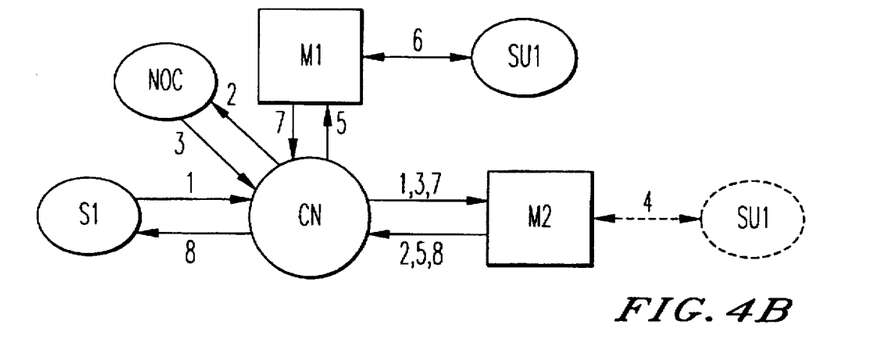

In FIG. 4B, the same subscriber S1, who is now in the metropolitan coverage area M2, to locate and/or send a message to SU1 that is still in M1 (1). The request is routed via the communications network CN to the Remotely Distributed Network Component M2. In this case, the local IS subsystem in M2 authenticates the subscribers, their subscriber units, and determines their home metropolitan coverage area via a request to the Regional IS subsystem at the Network Operations Center NOC (2,3). The M2 IS subsystem requests a location or outbound message from the M2 RF subsystem (4), but receives a "not in M2 coverage area" reply. The M2 IS subsystem then routes the request via the CN to the M1 IS subsystem (5) that interfaces to the M1 RF subsystem, and locates and/or sends the message to SU1 (6). The results are passed back to the M2 IS subsystem via the CN (7), which in turn communicates them to S1 via the CN (8).

Figure 4C:
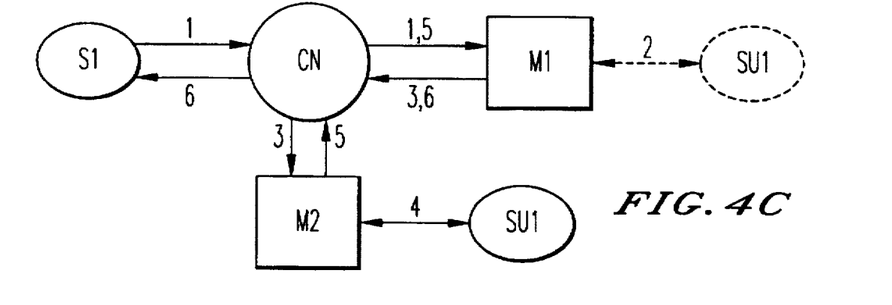

FIG. 4C is a block diagram that illustrates the situation where the subscriber S1 is making a request to the home metropolitan coverage area handled by M1 for the location of subscriber unit SU1 (1), but SU1 is in a different metropolitan coverage area handled by M2. In this case, after failing to locate and or send the message to SU1 (2), the IS subsystem in M1 initiates a methodical search for SU1 in other metropolitan coverage areas by routing requests to these areas (3). In this example, SU1 is located and/or the message is delivered by M2 (4) and the results are passed back to the M1 IS subsystem (5) that communicates them to the subscriber (6).

Figure 4D:
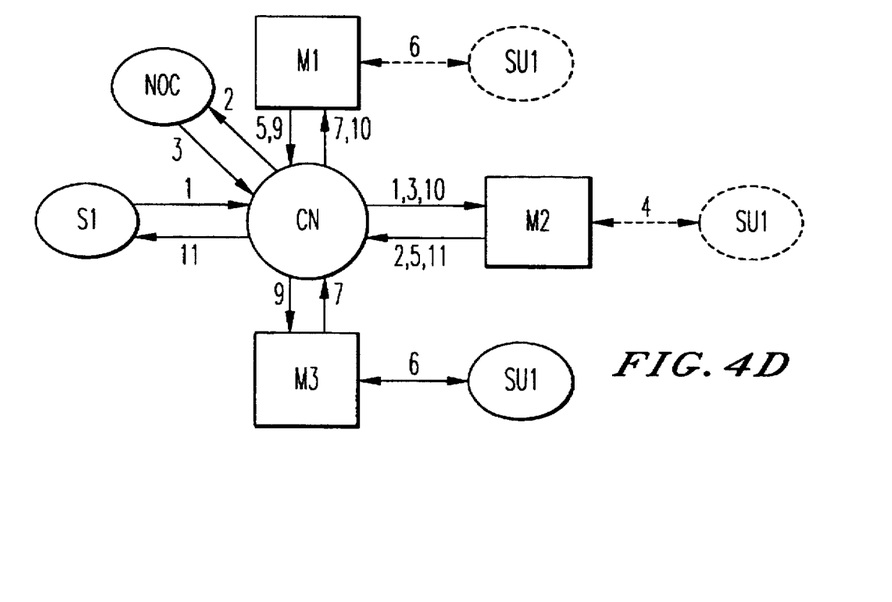

FIG. 4D is a block diagram that illustrates the situation where both the subscriber S1 and the subscriber unit SU1 are in different non-home metropolitan coverage areas. In this case, S1, who is in M2, requests a location and/or message transmission (1) to SU1 that is in M3. The M2 IS subsystem requests information on S1 and SU1 from the Regional IS subsystem at the NOC (2,3) and requests a location and/or outbound message from the M2 RF subsystem (4), but receives a "not in M2 coverage area" reply. The M2 IS subsystem routes the request to the IS subsystem in home metropolitan coverage area of S1 (M1) which controls the search for SU1 (5). It first requests a location and/or message transmission from the M1 RF subsystem (6). When this returns a "not in M1 coverage area" reply, the M1 IS subsystem continues the methodical search for SU1 in other metropolitan coverage areas by routing the request in some predefined order to them (7). In this example, SU1 is located in M3 (8) and the M3 IS subsystem passes the results back to the M1 IS subsystem (9), which in turn, communicates them to the M2 IS subsystem (10) for distribution to the subscriber (11).

It should be noted that the above examples assume an implementation where subscriber and subscriber unit data are not distributed to non-home metropolitan coverage areas and where the home metropolitan coverage area always controls the search process. Other implementations, including mixed strategies, e.g., replicating all of the subscriber/subscriber unit data in some of the metropolitan areas, are possible and easily generated with a system architecture possessing the characteristics discussed in the Section entitled "Architectural Advantages".

Regional Inbound (Asynchronous) Messaging

Regional inbound messaging allows an inbound message (status, data, emergency alert, request for information service) to be routed to the appropriate destination to service the request regardless of the coverage area (paging configuration) of origin. This effectively implements a seamless regional inbound messaging service for Teletrac™ subscribers.

Figure 5A:
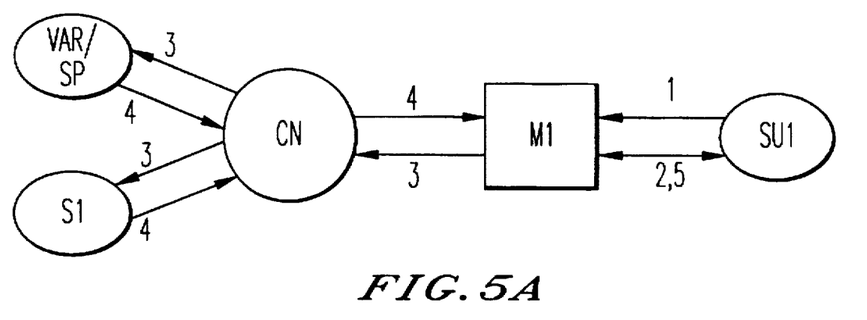

For example, FIG. 5A is a block diagram that illustrates the situation where a subscriber unit SU1 in its home metropolitan coverage area handled by M1 generates an inbound message of any of the types listed above (1) and the subscriber S1 or value-added reseller/service provider (VAR/SP) are connected through the same metropolitan coverage area. This is the normal case for providing inbound messaging services. In this case, the M1 IS subsystem authenticates that SU1 is authorized to receive services and determines the destination of the inbound message (either a subscriber or a service provider). Then, depending on the type of inbound message, it sends a request to the M1 RF subsystem to page SU1 to acknowledge its request (2). The response message from SU1 allows the M1 RF subsystem to determine the location of SU1 and receive additional data containing a service request (2). The M1 IS subsystem delivers this information to its destination (3). If the destination is a subscriber, the subscriber may or may not generate an acknowledgment to the inbound message. This actually is the same as an outbound message discussed in the Section entitled "Regional Paging (Location and Messaging)." If an acknowledge message is generated, the M1 IS sends a request to the M1 RF subsystem to page SU1 and send the message (5). If the destination is a service provider, the service provider processes the request and provides the requested information to the M1 IS subsystem (4). The M1 IS subsystem sends a request (for an outbound message) to the M1 RF subsystem to page SU1 and send a message containing the requested information (5).

Figure 5B:
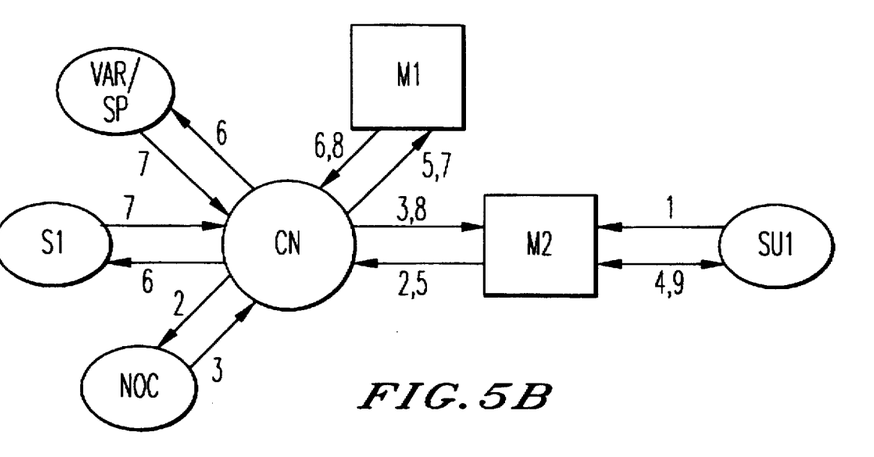

In FIG. 5B, the subscriber unit SU1 is not in its home metropolitan coverage area handled by M1 when it generates an inbound message requesting service (1). In this case, the M2 IS subsystem requests and receives the subscriber and SU1 information from the Regional IS subsystem at the NOC (2,3). Then, depending on the type of inbound message, it sends a request to the M2 RF subsystem to page SU1 to acknowledge its request (4). The response message from SU1 allows the M2 RF subsystem to determine the location of SU1 and receive additional data containing a service request (4). The M2 IS subsystem routes this information to the M1 IS subsystem (5) for delivery to the subscriber or a service provider (6). If the destination is a subscriber, an acknowledgment message could be sent (7) to the M1 IS subsystem, which routes it to the M2 IS subsystem (8), which then requests the M2 RF subsystem to page SU1 with the acknowledgement message (9). If the destination is a service provider, the service provider processes the service request and provides the requested information to the M1 IS subsystem (7), which routes it to the M2 IS subsystem (8). The M2 IS subsystem requests the M2 RF subsystem to page SU1 with an outbound message containing the requested information (9).

It should be noted that the above examples assume an implementation where subscriber and subscriber unit data are not distributed to non-home metropolitan coverage areas and where the home metropolitan coverage area always controls the delivery of information to the subscriber or service provider. Other implementations, including mixed strategies, e.g., replicating all of the subscriber and subscriber unit data in some of the metropolitan coverage areas, are possible and easily generated with a system architecture possessing the characteristics discussed in the Section entitled "Architectural Advantages."

Roaming

In a geographically distributed system with localized coverage areas (paging configurations), it is inevitable that some subscriber units will move from out of their home coverage area into other coverage areas and expect uninterrupted service. The Sections entitled "Regional Paging (Location and Messaging)" and "Regional Inbound (Asynchronous) Messaging" discussed regional service from the perspectives of outbound and inbound messaging. It is particularly important in outbound messaging that a search strategy finds the subscriber unit with a minimum number of tries. Roaming refers to the ability for a subscriber unit to "register" in a foreign coverage when it enters that area, and for this information to be readily available when searching for an subscriber unit.

In the preferred embodiment, roaming is implemented as follows. When a subscriber unit enters a foreign coverage area, it is able to recognize this fact and generates an inbound registration message. The inbound message is processed by the local RF subsystem and passed to the local IS subsystem, which in turn, informs the Regional IS subsystem at the Network Operations Center of the registration and receives back the identity of the subscriber unit's home coverage area. The Regional IS subsystem informs the IS subsystem in the home coverage area of the registration of the subscriber unit in the foreign coverage area. It also informs the IS subsystem in the previous coverage area in which the subscriber unit was registered that the subscriber unit has registered in a different coverage area.

Open Gateway

Within the last few years, there has been a dramatic increase in the number of subscribers to electronic networks that provide information and services. At the same time, network providers are seeking to differentiate their networks by expanding services available on them. It has become increasing important, therefore, that Teletrac™ services also be available through these networks. To accomplish this "internetworking", the new Teletrac™ architecture of the present invention includes an open gateway capability that allows Teletrac™ subscribers to access Teletrac™ location and messaging services via commercially available wireline and wireless services, such as Internet, AOL, Prodigy, ARDIS, RAM and others.

Figure 6:
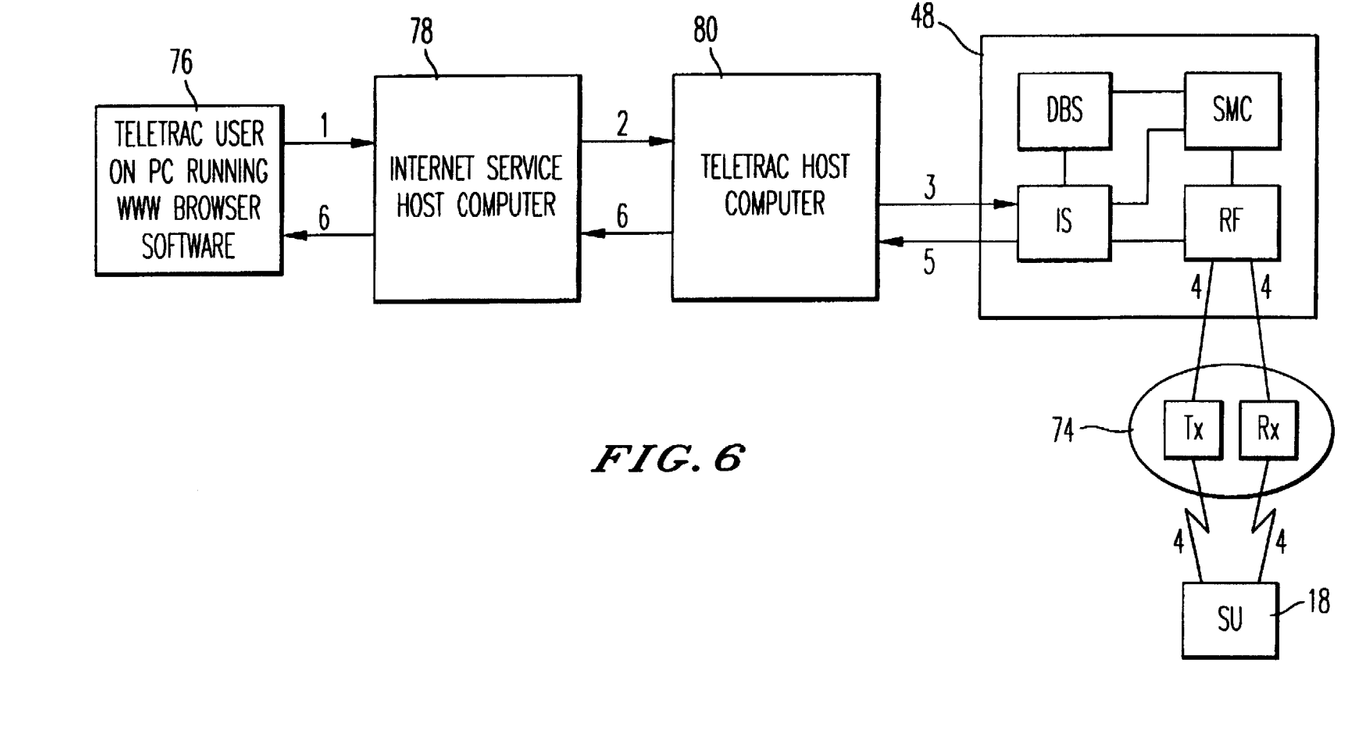
FIG. 6 is a block diagram that illustrates a Teletrac™ subscriber accessing the Teletrac™ location and messaging system using the Internet.

This is accomplished by adopting an industry standard communication protocol, e.g., TCP/IP, to handle the transport of information between networks, and by providing a controlled Application Programming Interface (API) software library for developers to use in their applications to generate the specific format and content of the messages that constitute the information flow between the user and the Teletrac™ system, e.g., login/logout, location requests, outbound message requests, locations, asynchronous inbound messages, etc. For networks that are not TCP/IP based, the open gateway capability utilizes hardware (bridges) and software (protocol converters) to convert the message formats to the appropriate form. The open gateway capability is implemented by the IS subsystem supported by the appropriate communication hardware. So, for example, a Teletrac™ subscriber can locate their vehicle or send a message using their Internet service. In the preferred embodiment illustrated in the block diagram of FIG. 6, a Teletrac™ subscriber accesses the host computer 78 (1) of their Internet service provider for World Wide Web (WWW) services using a web browser program running on a personal computer, portable computer, or personal digital assistant 76. By selecting "Teletrac™ Services", the subscriber is connected to the Internet host computer 80 (2) operated by the Teletrac™ system, and accesses the Teletrac™ location/ messaging service software. This software provides all request/response processing including user request decoding, Teletrac™ system software interface, reverse geocoding of locations yielding closest cross street information, and encoding of the response to the subscriber. The Teletrac™ Internet host computer 80 is connected, either directly or via the Communications Network 50, to an IS subsystem 62 in the Network Operations Center 46 or an IS subsystem 56 Remotely Distributed Network Component (3). The Teletrac™ system services the user's request (e.g., obtains location or sends message) and returns the result to the Teletrac™ Internet host 80 (5), which in turn, passes it to the subscriber via their Internet host computer 78 (6).

Conclusion

This concludes the description of the preferred embodiment to the invention. In summary, the present invention discloses a network of interconnected, remotely distributed, location and messaging systems. Each of the remotely distributed location and messaging systems can be dynamically configured to use different frequencies that are assigned to the regions. Each of the remotely distributed location and messaging systems performs location requests for specified subscriber units using one or more radio frequency transmitting sites and a plurality of radio frequency receiving sites. The location request is initiated by identifying a particular one of the remotely distributed location and messaging systems having a coverage area for the specified subscriber unit. The request is routed to the identified location and messaging systems, and a unique paging message is transmitted to the subscriber unit (SU). A response is received from the subscriber unit, and forwarded to a processor coupled to the identified location and messaging system. The processor resolves the response from the subscriber unit into a location for the subscriber unit within the coverage area of the identified remotely distributed location and messaging system.

The foregoing description of the preferred embodiment of the invention has been presented for purposes of illustration and description. It is not intended to be exhaustive or to limit the invention to the precise form disclosed. Many modifications and variations are possible in light of the above teachings. It is intended that the scope of the invention be limited not by this determined description, but rather by the claims of appended hereto.

What is claimed is:

1. A Distributed Location and Messaging System for providing location and messaging services, comprising:
   (a) one or more Remotely Distributed Network Components for providing the location and messaging services using radio frequency (RF) communications;
   (b) each of the Remotely Distributed Network Components providing a coverage area for a different associated geographic region;
   (c) each of the Remotely Distributed Network Components comprising means for performing a location and message request for a specified subscriber unit in the associated geographic region using one or more radio frequency transmitting sites and a plurality of radio frequency receiving sites;
   (d) one or more Network Operations Centers, coupled to all of the Remotely Distributed Network Components, for controlling operations of the Remotely Distributed Network Components; and
   (e) the Network Operations Centers and the Remotely Distributed Network Components together further comprising means for initiating the location and message request by identifying a particular one of the Remotely Distributed Network Components having a coverage area for the specified subscriber unit, means for routing the location and message request to the identified Remotely Distributed Network Component, means for transmitting a unique paging message to a subscriber unit, means for receiving a response from the subscriber unit, means for forwarding the response from the subscriber unit to a processor coupled to the identified Remotely Distributed Network Component, and means for resolving the response from the subscriber unit into a location for the subscriber unit within the coverage area of the identified Remotely Distributed Network Component.

2. The Distributed Location and Messaging System of claim 1 above, wherein each of the Remotely Distributed Network Components is comprised of a configurable number of interconnected subsystems comprising a System Monitoring and Control (SMC) subsystem, a Database Services (DBS) subsystem, an Information Services (IS) subsystem, and a Radio Frequency (RF) subsystem.

3. The Distributed Location and Messaging System of claim 2 above, wherein the SMC subsystem comprises means for monitoring and controlling the operation of all components of the system.

4. The Distributed Location and Messaging System of claim 3 above, wherein the means for monitoring and controlling comprises means for collecting status information from all subsystems at the Network Operations Center and in the Remotely Distributed Network Components, and for relaying the status information back to a monitoring point.

5. The Distributed Location and Messaging System of claim 4 above, wherein the monitoring point comprises an SMC subsystem in the Network Operation Center.

6. The Distributed Location and Messaging System of claim 2 above, wherein the RF subsystem comprises means for controlling and processing information transmitted over an RF portion of the system.

7. The Distributed Location and Messaging System of claim 6 above, wherein the means for controlling and processing comprises means for controlling and processing the information from one or more Paging Configurations.

8. The Distributed Location and Messaging System of claim 7 above, wherein each Paging Configuration comprises a complete, independent, synchronized and calibrated location and messaging system coverage area, each Paging Configuration being further comprised of transmitting and receiving sites.

9. The Distributed Location and Messaging System of claim 8 above, wherein each Paging Configuration comprises a Paging Configuration table stored in a memory of a processor in the RF subsystem that stores a configuration for the transmitting and receiving sites.

10. The Distributed Location and Messaging System of claim 2 above, wherein the IS subsystem comprises means for message processing and routing in the system, and means for interfacing to internal and external users of the system.

11. The Distributed Location and Messaging System of claim 2 above, wherein the DBS subsystems comprises means for storing and maintaining customer profile information for access authentication and routing instructions, and for storing and maintaining usage data for billing.

12. The Distributed Location and Messaging System of claim 1 above, wherein the Network Operations Center is comprised of a Regional DBS subsystem, a Regional IS subsystem, and an SMC subsystem.

13. The Distributed Location and Messaging System of claim 12 above, wherein the Network Operations Center is further comprised of one or more RF subsystems.

14. The Distributed Location and Messaging System of claim 1 above, further comprising means for dynamically routing a response to the location request to a value-added reseller coupled to one of the Remotely Distributed Network Components.

15. The apparatus of claim 1, further comprising means for dynamically configuring each of the Remotely Distributed Network Components, wherein each of the RF subsystems therein is configurable to use different frequencies by specifying parameters required for handling responses in a particular frequency.

16. The Distributed Location and Messaging System of claim 1 above, further comprising means for accessing the Remotely Distributed Network Components and the Network Operation Center from external communications networks.

17. The Distributed Location and Messaging System of claim 1 above, wherein the means for initiating the location and message request comprises means for initiating the location and message request in response to a request from a first subscriber unit, means for identifying a particular one of the Remotely Distributed Network Components having a coverage area for a second subscriber unit identified by the request from the first subscriber unit, means for routing the location and message request to the identified Remotely Distributed Network Component, means for transmitting a unique paging message to the second subscriber unit, means for receiving a response from the second subscriber unit, means for forwarding the response from the second subscriber unit to a processor coupled to the identified Remotely Distributed Network Component, and means for resolving the response from the second subscriber unit into a location for the second subscriber unit within the coverage area of the identified Remotely Distributed Network Component.

18. The Distributed Location and Messaging System of claim 1 above, further comprising roaming means for allowing the subscriber unit to register in a foreign coverage area, the roaming means comprising means for receiving a registration request from the subscriber unit in the foreign coverage and means for updating routing instructions for the subscriber unit in response to the registration request, so that location and message requests intended for the subscriber unit are transmitted to the Remotely Distributed Network Components associated with the foreign coverage area.

19. A Distributed Location and Messaging System for providing location and messaging services, comprising:
   (a) one or more Remotely Distributed Network Components for providing the location and messaging services using radio frequency (RF) communications;
   (b) each of the Remotely Distributed Network Components providing a coverage area for a different associated geographic region;
   (c) each of the Remotely Distributed Network Components comprising means for performing a location and message request for a specified subscriber unit in the associated geographic region using one or more radio frequency transmitting sites and a plurality of radio frequency receiving sites;
   (d) one or more Network Operations Centers, coupled to all of the Remotely Distributed Network Components, for controlling operations of the Remotely Distributed Network Components; and
   (e) the Network Operations Centers and the Remotely Distributed Network Components together further comprising means for initiating a location and message request in response to a request from a first subscriber unit, means for identifying a particular one of the Remotely Distributed Network Components having a coverage area for a second subscriber unit identified by the request from the first subscriber unit, means for routing the location and message request to the identified Remotely Distributed Network Component, means for transmitting a unique paging message to the second subscriber unit, means for receiving a response from the second subscriber unit, means for forwarding the response from the second subscriber unit to a processor coupled to the identified Remotely Distributed Network Component, means for resolving the response from the second subscriber unit into a location for the second subscriber unit within the coverage area of the identified Remotely Distributed Network Component, and means for transmitting the location for the second subscriber unit within the coverage area of the identified Remotely Distributed Network Component to the first subscriber unit.

20. A Distributed Location and Messaging System for providing location and messaging services, comprising:
   (a) one or more Remotely Distributed Network Components for providing the location and messaging services using radio frequency (RF) communications, wherein each of the Remotely Distributed Network Components is comprised of a configurable number of Radio Frequency (RF) subsystems, each of the RF subsystems comprising a Paging Configuration, each of the Paging Configurations comprising of one or more radio frequency transmitting sites and a plurality of radio frequency receiving sites, each of the Paging Configurations comprising a Paging Configuration table stored in a memory of a processor in the RF subsystem that stores a configuration for the transmitting sites and the receiving sites, each of the transmitting sites and the receiving sites being configurable to use different frequencies by specifying parameters required for handling responses in a particular frequency in the Paging Configuration tables;
   (b) each of the Remotely Distributed Network Components comprising means for performing a location and message request for a specified subscriber unit in the associated geographic region using one or more of the radio frequency transmitting sites and the radio frequency receiving sites; and
   (c) one or more Network Operations Centers, coupled to all of the Remotely Distributed Network Components, for controlling operations of the Remotely Distributed Network Components.

* * * * *